Oct. 30, 1962   G. V. PLANER ETAL   3,061,771
TRANSDUCERS
Filed Aug. 15, 1958

INVENTOR
George Victor Planer
Robert William Windebank
BY Pierce, Scheffler & Parker
ATTORNEY United States Patent Office 3,061,771
Patented Oct. 30, 1962

3,061,771
TRANSDUCERS
George Victor Planer and Robert William Windebank, Sunbury-on-Thames, England, assignors to Cosmocord Limited, Waltham Cross, England
Filed Aug. 15, 1958, Ser. No. 755,167
2 Claims. (Cl. 323—94)

This invention relates to transducers using a material which exhibits Hall effect or the magneto-resistive phenomenon. The invention can be applied to a variety of transducers including, for example, gramophone pickups, microphones, pressure sensitive devices, strain gauges, thickness gauges and accelerometers. The invention has for its object to provide an improved transducer of this kind.

In accordance with the invention there is provided a transducer making use of the Hall or magneto-resistive effect, comprising a transducer element in a magnetic field in which the magnetic field pattern is varied in accordance with the variations of the variable to which the transducer is to respond.

The invention also provides a transducer making use of the Hall or magneto-resistive effect in which the transducer element is arranged in an air-gap in one of two parallel paths defined by a circuit of magnetisable material, the relative field intensity in the two paths being variable in accordance with the variations of the variable to which the transducer is to respond.

Further, the invention provides a transducer making use of the Hall or magneto-resistive effect in which the transducer element is secured in position in an air-gap defined in a circuit of magnetisable material, the field intensity in the air-gap being variable by varying the reluctance of a shunt path of the magnetic circuit.

Figure 1:
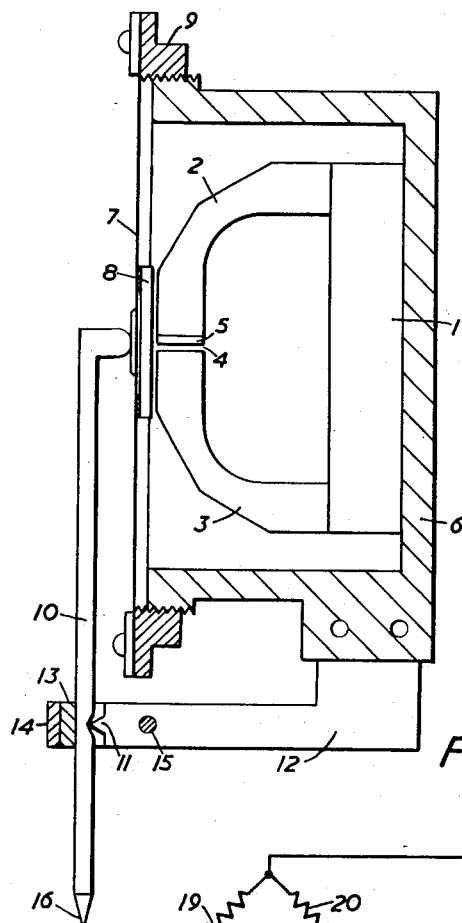
Figure 2:
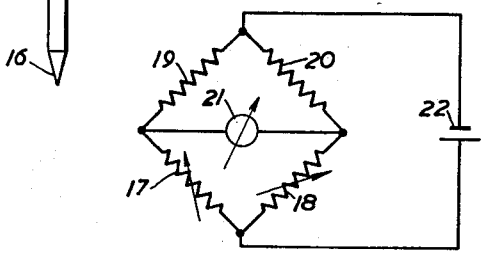

In order that the invention may be more readily understood one particular embodiment thereof will now be described, by way of example only, with reference to the accompanying drawings in which:

FIGURE 1 is a cross-sectional elevation of an accelerometer device in accordance with the present invention; and FIGURE 2 is a circuit diagram of one connection arrangement for a device in accordance with the present invention.

In a device operating by the Hall or magneto-resistive effects, a resistance element is disposed in a magnetic field, and the resistance of that element, or a voltage produced thereby, is related to the intensity of the magnetic field. One method of varying the magnetic field in which the element is disposed is to provide a field of non-uniform distribution, and to move the element through the non-uniform part of the field. With such an arrangement it is difficult to provide a field pattern which changes in intensity rapidly over a short distance, and in consequence the element has to be moved through an appreciable distance to obtain a sufficient variation of resistance or voltage output. In the case of a device such as a microphone or gramophone pickup where the amplitude of movement is small or the available power to drive the element is small, this requirement imposes a limitation upon the design of a transducer.

In the device of FIGURE 1 the magnetic field pattern is varied in accordance with the variations of the variable to which the transducer is to respond. This makes it possible to use a stationary element which is an advantage as the transducer element may be of comparatively fragile construction.

The device shown in FIGURE 1 is a transducer which includes a member 1 of permanent magnetic material, having thereon pole pieces 2, 3 which define between them a small narrow air-gap 4 having a width of, for example, about 1.5 mils, in which is disposed a transducer element 5 consisting of a support having thereon a layer of material which exhibits the Hall or magneto-resistive effect. A suitable element consists of a support of, or having a surface of insulating material upon which is disposed of a layer of indium antimonide. The transducer element may have a thickness of, for example, about .4 mil. Various methods of forming elements suitable for this purpose are disclosed in our copending application and the constructions described therein can be used in conjunction with the present invention, but as will appear hereinafter, it is advantageous to have the element in the form of a corbino disc.

However, for the purposes of the present invention it is not necessary that the air-gap in which the transducer element is disposed should be substantially wider than that which is necessary to accommodate the element, since the element is permanently secured in position and is not required to move in operation. The pole pieces are preferably shaped, by being reduced in cross section towards the air-gap, so that a high magnetic flux density is secured in the air-gap in which the element is disposed.

The transducer device is contained in a housing 6 having a diaphragm 7 carrying an armature 8 of magnetic material which spans the pole pieces 2, 3. The armature 8 is normally disposed so as to be spaced from the pole pieces 2, 3 by adjustment of a ring 9 which carries the diaphragm 7 of resilient material and is in screw threaded engagement with the housing 6. The movement of the armature is effected by a lever 10 which is carried on a knife edge pivot 11 on a support arm 12 secured to the housing 6. The movement of the lever 10 is damped by a pad of friction material 13 held against the arm 10 by a clamp 14 secured to the support arm 12 by a screw 15. The free end of the arm 10 is shaped to a point 16 which is adapted to engage an object and move the armature 8 nearer to or further away from the pole pieces 2, 3 in accordance with the vibration of the object and thereby divert some of the magnetic flux from the main air-gap 4.

In a modification of the device described above the diaphragm 7 may be formed of a resilient member of magnetic material, thus dispensing with the armature 8.

In a gramophone pickup or microphone the diaphragm 7 can be moved in response to the movement of a gramophone stylus or a microphone diaphragm. In the case of a microphone the diaphragm 7 may itself be the microphone diaphragm.

It may be more convenient to arrange that the magnetic circuit has two sets of pole pieces with two air-gaps, the main gap in which the element is disposed and the shunt gap, the reluctance of which is varied by the armature. With such a construction the shunt pole pieces can be shaped to present a relatively long gap between them. Thus, the pole pieces can be made so as to have inter-engaging portions so that the gap between them is of sinuous or zigzag shape, and the armature can then lie over the general area of this air-gap.

In can also be arranged that a single armature acts for a plurality of transducer elements, with a plurality of shunt air-gaps the reluctance of which is varied by the movement of the one armature. In one such construction the armature takes the form of a member of magnetic material pivoted at its centre, the ends of the armature being disposed adjacent the shunt air-gaps of two transducer elements substantially as described. In this way the two transducer elements are operated differentially, and their outputs can be used accordingly.

In another arrangement the reluctance of the shunt air-gap is varied by the insertion to a greater or lesser extent of a moving magnetic member into, as distinct from adjacent, the shunt air-gap. A gramophone can be provided by a pivoted vane of magnetic material, the pivotal movement of which inserts the vane to a greater or lesser extent into the shunt air-gap. An arrangement of this kind has the advantage that it avoids non-linearity of response due to the inverse square law response which is obtained if the air-gap is directly varied in dimension.

The various embodiments of the invention described all have the advantage that it becomes possible to use a high flux density for the element when it is in its position of zero response. A high flux density gives a high resistance to the material in the zero position and this in turn involves the use of a low standing direct current through the element if the magneto-resistive effect is being used. In practice, the resistance of an indium antimonide corbino disc is reduced to a value of about one twentieth for a fall in flux density of 10 kilogauss, or to one tenth with a meandered element for the same change in magnetic flux. A convenient working flux density is of the order of 10 kilogauss.

A transducer in accordance with the present invention may comprise two transducer elements from one of which an output signal is derived in accordance with the variations of the variable to which the transducer is to respond. The other element is arranged to be connected to minimise or obviate temperature effects on the one element. The two transducer elements are then arranged as shown in FIGURE 2, the one element 17 and the other element 18 are connected in adjacent arms of a bridge circuit. The remaining arms 19, 20 are formed by resistors. The load of the transducer is represented by a meter 21 and the power source by the battery 22. It will be appreciated that the load may, in practice be, for example, a loudspeaker or the input impedance of an amplifier device. Further the power source 22 may be other than the battery shown.

We claim:

1. A transducer making use of the Hall or magneto-resistive effect, and comprising a magnetic structure having a pair of spaced stationary pole pieces defining an air-gap therebetween, means producing a magnetic field across said air-gap, a transducer element of a material displaying the magneto-resistive effect mounted stationary in said air-gap so as to be subject to said magnetic field, electrical connections to said transducer element whereby changes in the electrical resistance thereof due to changes in the magnetic field in said air-gap may be detected, resilient armature means of magnetic material spanning said air-gap in spaced relation to the sides of said pole pieces, and means under control of a parameter whose variations are to be converted into electrical variations for varying the spacing between said magnetic armature means and the sides of said pole pieces to thereby shunt a corresponding variable amount of said magnetic field from said air-gap.

2. A transducer as defined in claim 1 wherein said resilient armature means comprises an armature member of magnetic material supported by a member of resilient material.

References Cited in the file of this patent

UNITED STATES PATENTS

| | | |
|---|---|---|
| 2,419,697 | Wolff | Apr. 19, 1947 |
| 2,493,388 | Candy | Jan. 3, 1950 |
| 2,553,491 | Shockley | May 15, 1951 |
| 2,736,858 | Welker | Feb. 28, 1956 |
| 2,752,434 | Dunlap | June 26, 1956 |